United States Patent
Sangster et al.

(10) Patent No.: US 6,550,248 B1
(45) Date of Patent: Apr. 22, 2003

(54) ELECTRICAL GENERATING SYSTEM USING SOLAR ENERGY

(76) Inventors: Bruce Sangster, 3857 Birch St., Newport Beach, CA (US) 92660; James D. Bond, 3857 Birch St., Newport Beach, CA (US) 92660

(*) Notice: Subject to any disclaimer, the term of this patent is extended or adjusted under 35 U.S.C. 154(b) by 0 days.

(21) Appl. No.: 10/177,701
(22) Filed: Jun. 21, 2002
(51) Int. Cl.[7] .............................. B60K 16/00
(52) U.S. Cl. .................. 60/641.8; 60/641.15
(58) Field of Search ............... 60/641.8, 641.9, 60/641.13, 641.14, 641.15

(56) References Cited

U.S. PATENT DOCUMENTS

| | | | |
|---|---|---|---|
| 4,045,315 A | * 8/1977 | Fletcher et al. | 204/157.5 |
| 4,105,517 A | * 8/1978 | Frosch et al. | 204/157.5 |
| 5,513,494 A | 5/1996 | Flynn et al. | 60/641.6 |
| 5,626,020 A | 5/1997 | Sangster et al. | 62/3.1 |
| 5,632,147 A | * 5/1997 | Greer | 60/641.15 |
| 5,870,892 A | 2/1999 | Gamoso | 60/407 |
| 6,123,868 A | 9/2000 | Sangster et al. | 252/73 |

OTHER PUBLICATIONS

Mochizuki, Hitoshi, An Energy Conversion Method by Using Density Difference of Water, 1997, Electrical Engineering in Japan, vol. 118, No. 2.

* cited by examiner

Primary Examiner—Hoang Nguyen

(57) ABSTRACT

A method for generation of electricity is disclosed in which solar heat energy is collected in a photochromic heat exchange medium which flows to a generating system which converts the flow energy of the medium to mechanical energy driving a generator to produce electricity.

2 Claims, 3 Drawing Sheets

ELECTRICAL GENERATING SYSTEM USING SOLAR ENERGY

FIELD OF THE INVENTION

Figure 1:
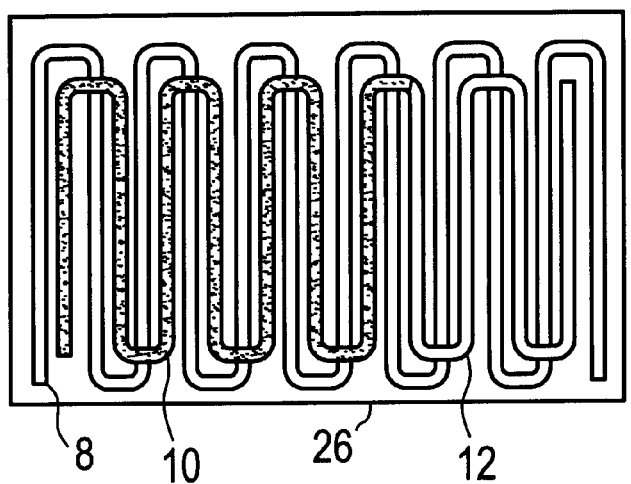

The present invention relates to the use of solar heat energy to generate electricity. The invention defines a method, which produces electricity using a photochromic medium, which captures and contains solar energy at moderate temperatures. The heat energy contained in the medium is converted to electric energy in a generating system, which increases the kinetic force of the medium flow sufficient to drive an impeller, which drives the stator of an electric generator.

RELATED AND PRIOR ART

We have been unable to locate any prior art which pertains to the use of a photochromic heat exchange medium as a means to effect an energy conversion of heat induced fluid flow to drive a generator of electrical energy.

There is, however, a substantial body of prior art, which relates to the use of temperature differences in various depths of seawater to generate electricity, generally termed Ocean Thermal Energy Conversion (OTEC). Flynn, et al., U.S. Pat. No. 5,513,494, teaches the use of the temperature differences inherent in different depths of seawater and by vaporizing the warmer water generates electricity in a vapor driven turbine. Flynn does not teach the use of a photochromic heat exchange medium to store energy or convert that energy to electricity.

Ocean Thermal Energy Conversion methods have demonstrated marginal economic results due primarily to the limited heat retention capacity of water and the substantial energy and cost required to pump colder ocean water occurring several thousand feet below the surface to the vessels at the surface in which the systems have been contained. These systems are limited to ocean sites where depths are sufficient to offer the temperature differences required.

The photochromic medium utilized in the invention provides a heat containment capacity from 4.5 to 8 times greater than that of water which, in part, assures a substantially more efficient method.

Mochizuki, in a paper presents a means different than that cited in Flynn and by others for directly exposing the ocean water collected at different depths thereby converting those temperature differences to mechanical energy.

Photovoltaic systems for the generation of electrical energy directly from solar light sources are in broad use particularly in areas where electric utility power is not available. These systems utilize a silicon base structure, which accepts a portion of the solar spectrum directly stimulating small packets of photon energy, which are transformed to electrons. Due to the limited means for generation of photons, a substantial surface of silicon must be exposed to generate effective power. Due to the conversion of solar light to directly generate electric power this method is not comparable to the present invention. The economic result is a cost of electric power, which is three to four times greater than the average cost of power provided by utilities in most areas. This may be compared with a projected cost of electric power generated by the invention 75% lower than that presently provided by most utilities. The advantage of the invention over photovoltaic systems is significant.

The stirling engine expands a confined gas through exposure to concentrated heat. Versions of the engine concentrate solar heat to expand the gas. The expanded gas produces mechanical power in a cylinder enclosing a piston. The expanded hot gas is then cooled and returned to the chamber and the cycle begins again. The engine is able to transform heat into effective work because the expansion of the gas at high temperature delivers more work than is required to compress the same amount of gas at low temperature. The necessity of rapid removal of heat from the hot working gas requires a radiator, which increases the complexity and cost of the engine while reducing its efficiency. The cost of electric power produced by a solar activated stilling engine is comparable to that of photovoltaic panels with the result that the subject invention has a substantial economic advantage.

The Ford Model T vehicle engine cooling method utilized a radiator to effect heat transfer from the coolant. The resultant temperature differences accomplished the required flow rate in the enclosed system between the cylinders to the radiator and return. The method did not include a coolant pump. The subject invention does not require a pump.

Gamoso, U.S. Pat. No. 5,870,892 teaches the conversion of potential energy of compressed air in a fluid through an air engine capturing this potential energy to drive a generator. Gamoso does not teach the use of a fluid flow driven by temperature gradients and its conversion of kinetic energy through a venturi flow system which drives an electrical generator, as in the present invention.

Solar thermal electric power is generated from the heat of the sun in systems using lenses and reflectors to concentrate the heat energy of the sun. In one method multiple solar parabolic troughs focus the sun's energy on oil or molten salt circulating through pipes which are routed to a heat exchanger where steam is produced which drives a conventional turbine electric generator. In another configuration, a tower is at the center of a surrounding array of heliostat mirrors which track the sun reflecting the solar radiation to a receiver in the focal point center of the tower. Th e collected heat energy is used to create steam, which drives a conventional turbine electric generator. The operating temperatures and scale of these systems is substantial as is their generation capacity, normally in the hundreds of megawatts. As a result these systems do not offer power generation on a distributed basis but must rely on the grid to distribute their power generation. These systems in present practice do not provide the distributed, low cost service offered by the subject invention.

Prior art related to photochromic compounds includes two patents of the inventor;

Sangster, et al. U.S. Pat. No. 6,123,868 (September 2000) teaches the use of a photochromic compound attached to a biopolymer, as a medium to capture and release heat. In this patent Sangster does not teach implementation of the compound in a heat transfer means to create density differences or a venturi to create increased flow rate of the compound increasing kinetic energy which is converted to electricity as in the present invention.

Sangster, et al. U.S. Pat. No. 5,626,020 (May 1997) teaches the use of a photochromic heat exchange medium applied in a cooling and air conditioning system to store and release heat. This patent does not teach the use of these compounds as a means to increase flow and effect an energy conversion from kinetic energy to electricity as in the present invention.

There is a substantial body of prior art on photochromic compounds and their extensive use in optical devices to modulate light transmission. These applications do not implement heat containment and are therefore not comparable to the present invention.

There is also a vast body of prior art, which describes the difference in density of fluids and their flow through venturi systems, used in instruments or flow meters to detect the amount of energy in that flow.

PRIOR ART REFERENCES

U.S. Pat. No. 6,123,868 September 2000 Sangster et al.
U.S. Pat. No. 5,870,892 February 1999 Gamoso
U.S. Pat. No. 5,626,020 May 1997 Sangster et al
U.S. Pat. No. 5,513,494 May 1996 Flynn et al

PUBLISHED REFERENCES

1. "An Energy Conversion Method by Using Density Difference of Water", Hitoshi Mochizuki, in Electrical Engineering in Japan, Vol 118, No 2, 1997.

We believe that the referenced prior art does not teach the present invention.

OBJECTS AND ADVANTAGES

Several objects and advantages of the invention are,

The exposure of a photochromic heat exchange medium to solar heat in a panel. Occluded dark tubing in the initial section of the panel absorbs and transfers the heat of the sun to the flowing medium. On contact with heat the molecular structure of the medium closes effecting the storage of heat. Implementation of the reversion of the molecular structure of the medium to an open state releasing heat contained in the medium is accomplished in the following section of the panel by continued flow through clear tubing exposing the medium to sunlight. The medium then flows to the generator section. Flow of the medium is in a closed system.

Alternatively, the heated medium retaining heat in its closed molecular state is conveyed to a storage container. When release of heat is required the medium is conveyed through clear tubing where on exposure to artificial strobe light the molecular structure opens, releasing heat.

Acceleration of the flow rate of the medium is accomplished by a density differential between the heat bearing medium and the temperature of the conveying tubing and venturi due to the exterior of the those structures being surrounded by a cooler bath contained within the enclosure of the generator Configuration of the latter section of the generator as a venturi further accelerates the flow rate of the medium.

The energy of flow of the medium is squared on conversion to kinetic energy where, in the last section of the venturi, that energy drives an impeller attached to the stator of a generator, which generates electricity.

Absorption and transfer of the heat transferred from the medium to the bath surrounding the generation section is accomplished by an enclosed impervious heat exchanger. The heat exchanger located inside and at the top of the generator enclosure absorbs heat in circulating potable water, which supplies heated water for use within the structure served by the generator. Thereby reducing the energy required to heat water.

LIST OF DRAWINGS

Figure 2:
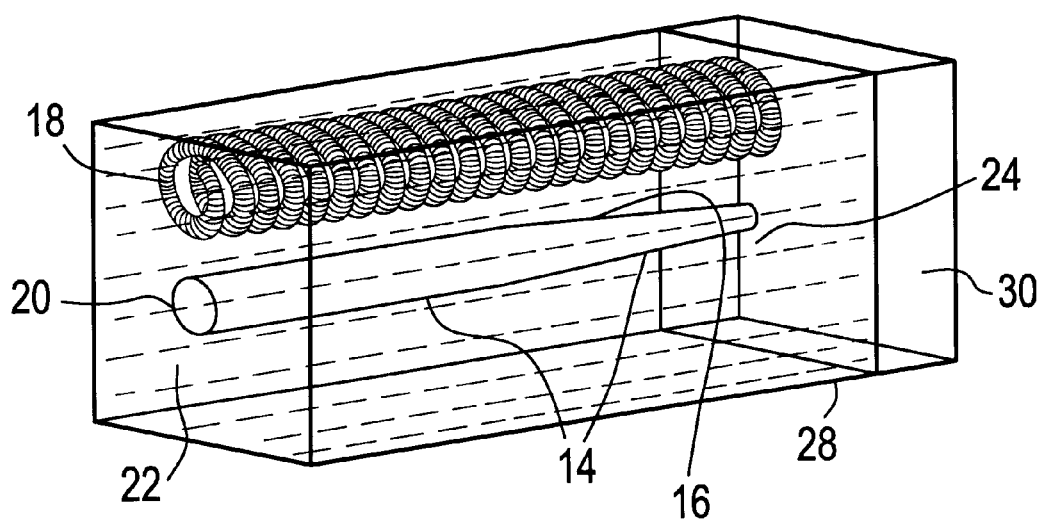
Figure 3:
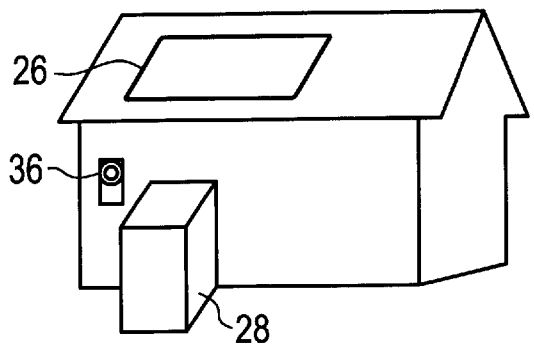
Figure 4:
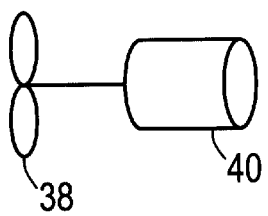
Figure 5:
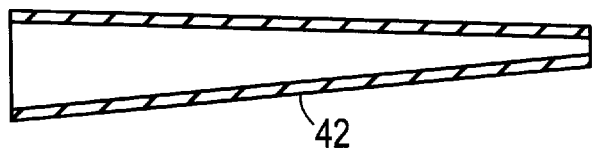
Figure 6:
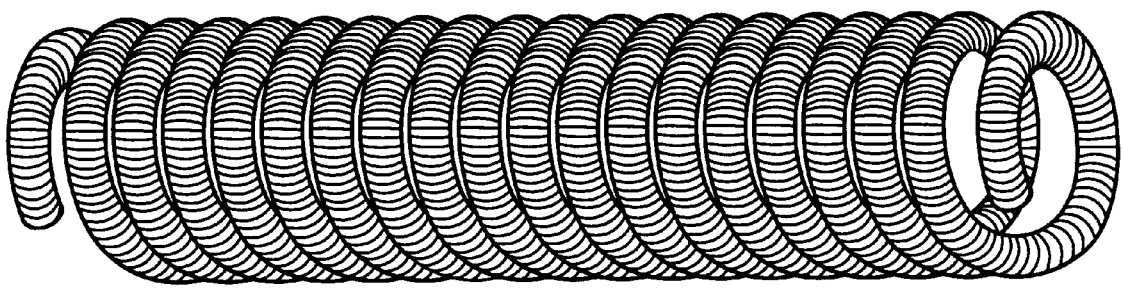

FIG. 1 Solar Panel
FIG. 2 Generator Section
FIG. 3 Positioning of System Components on a Structure
FIG. 4 Impeller drive of the Generator
FIG. 5 Venturi
FIG. 6 Potable water heat exchanger

REFERENCE NUMERALS FOR DRAWINGS

8 Potable water from the heat exchanger located in the generator enclosure.
10 Black tubing containing the medium absorbing heat.
12 Clear tubing exposing the medium to light; releasing heat.
14 Location of Venturi section increasing the flow rate of the medium.
16 Location in Venturi of Generator with impeller.
18 Location of Potable water heat exchanger.
20 Hot medium from the solar panel enters generator.
22 Cold fluid bath surrounding the generator and venturi.
24 Medium returns to solar panel.
26 Solar panel.
28 Generator enclosure.
30 Section of the Generator containing controls and plumbing exit.
36 Electric panel & meter.
38 Impeller.
40 Generator.
42 Venturi.

SUMMARY

This invention is comprised of a solar panel, which contains black obscured tubing and transparent clear tubing. The invention employs a photochromic heat exchange medium. The medium absorbs and captures heat in the black tubing subsequently, on exposure to light, releasing that heat in the clear tubing. The medium containing heat flows in the closed system to the generating section. The generating section is surrounded by a cool bath where on contact the density of the medium is increased incrementing its rate of flow. The medium then enters a venturi section where the energy of the flow of the medium is further accelerated. The flow energy of the medium is converted to kinetic energy on contact with an impeller connected to the stator of a generator which produces electricity.

DESCRIPTION OF THE INVENTION

Photochromism as applied in the present invention is the reversible change of a chemical compound between two states in which the molecular structure of the compound is altered to affect its state. The compound utilized in this invention is a molecular compound (side chain) attached to a larger organic polymer. The side chain and polymer are contained in a solvent. The combined elements are termed a photochromic medium. In the present invention the initial change in molecular structure of the medium is effected by exposure to solar heat radiation. Each packet of heat absorbed by the photochrome excites the molecular structure of the polymer and side chain, which convert from an open to a closed configuration. This configuration effectively secures and contains the absorbed heat. The thermal energy barrier to conversion is defined by the design of the system and the particular photochrome is formulated to effect the operation of the medium in the present invention. The absorbance of the solvents compounded with the photochromic solution produce an additional quantum of heat containment.

Photochromism also defines a reversible state of the molecular structure of the photochromic compound. The state in which heat is contained is reversed on exposure of the medium compound to light as it flows through clear tubing in the last section of the solar panel. Exposure of the medium to light changes the state of the molecular structure of the medium whereby the structure opens releasing the contained heat.

OPERATION OF THE INVENTION

As shown in FIG. 1, the photochromic heat exchange medium begins the generating cycle by flowing through occluded dark tubing 10 of the solar panel 26. The medium changes configuration absorbing the heat in a closed molecular form. The medium continues its flow to clear tubing 12 where it is exposed to solar light. The visible light spectra causes the medium to change form, opening its structure, releasing the stored heat to the solution component of the medium which contains unrestricted heat absorbed in the dark tubing. The heat bearing medium flows in a closed system to the generator section 28 shown in FIG. 2. The medium enters and is contained in the generator section by tubing 20 of a larger diameter than the conveying tubing. The generator section is immersed in a cool bath 22. The cool bath surrounding the generator section absorbs heat from the medium thereby increasing the density of the medium. The density change increases the flow rate of the medium. The heat released by the medium to the surrounding bath is absorbed in potable water flowing through the heat exchanger located at the top of the generator section 18. The medium then enters the venturi section 14 where the incrementally narrowing interior diameter of passage 42 further increments the rate of flow of the medium. The flow of the medium drives an impeller 38 that turns the stator of the generator 40 generating electricity. The medium leaves the generator section flowing back in the closed system 24 to the occluded dark tubing 10 of the solar panel 26 to repeat the process.

The level and amount of electricity generated is controlled by varying the dimensions of the tubing systems, and thereby the flow rate; the size of the solar panels and thereby the amount of temperature differential and in turn the relative density differences. The system is scalable to produce several kWh.

In another configuration, the photochromic heat exchange medium containing heat is stored in a containment vessel located near the generation system. When heat in the stored medium is required it is released by activating an artificial light source in the visible spectra as the medium flows through clear tubing. The light source of a flash lamp is pulsed in order to reduce the energy required. Heat storage is particularly appropriate in circumstances when solar irradiation is occluded or in geographical areas where weather does not provide a continuous availability of solar energy. Due to the closed molecular structure of the medium compound in the form in which heat is contained there is very little heat loss to surrounding containing structures.

The generation system incorporates a method to utilize heat released to the bath surrounding the generating section to provide hot water for use in the structure or dwelling. The potable hot water system accepts water from the primary supply lines or sources for the structure or dwelling, piping it to heat exchangers incorporated in the top section of the generator. After absorbing heat from the bath surrounding the flow sections of the generator, the potable water is piped to the hot water system of the structure. Alternatively, the potable water may be piped to the solar panel where it absorbs additional heat. The potable water is then piped to the hot water system of the structure.

In an alternative configuration of the components of the system, the solar panel 26 is mounted and integrated with the generator enclosure 28. This configuration permits location of the system to as sure optimum solar exposure while avoiding obstructions.

Although the description above contains much specificity, this should not be construed as limiting the scope of the invention but as merely providing illustrations of some of the presently preferred embodiments of the invention. Various other embodiments and ramifications are possible within its scope. Thus the scope of the invention should be determined by the appended claims and their legal equivalent rather than the examples given

CONCLUSIONS RAMIFICATIONS & SCOPE

This invention teaches the use of a photochromic heat exchange medium to store heat absorbed from solar irradiation. The heated medium is then directed to the generating section, which is immersed in a cooler bath of liquid. The density difference between the two solutions stimulates flow, which is then further accelerated by a narrowing venturi. The kinetic force of the medium flow rotates an impeller, connected to the stator of a generator producing electricity.

In the preferred embodiment, the photochromic heat exchange medium absorbs heat from sunlight as it flows through the opaque tubing of the solar irradiation panel. The medium next flows through clear tubing of the solar irradiation panel causing the medium to release its stored heat into the medium solution. The resulting hot medium solution is piped to the generator section which is surrounded by a cooler bath of liquid. The rate of flow of the medium is enhanced by the density difference of the heated solution and the surrounding cooler liquid. A narrowing venturi further increases the rate of flow of the medium. The result is a conversion of the energy of the medium flow into kinetic energy. At the end of the narrowing venturi system and internal to the tubing, an impeller is rotated by the kinetic energy of the flow rate. The impeller is attached by a shaft to the stator of a generator which generates electricity.

What is claimed is:

1. An energy conversion system, generating electricity from solar heat comprising;
    (a) a panel exposed to sunlight,
    (b) a photochromic heat exchange medium which absorbs and releases heat in the solar panel,
    (c) a generation section which receives and accelerates the flow of the medium,
    (d) an impeller connected to the stator of a generator which is driven by the flow of the medium to generate electricity.
2. A system, as in claim 1, where the release of heat by the medium is implemented by an artificial light source.

* * * * *